(12) United States Patent
Udall et al.

(10) Patent No.: US 7,806,363 B2
(45) Date of Patent: Oct. 5, 2010

(54) ENGINE MOUNTING ASSEMBLY

(75) Inventors: Kenneth F Udall, Derby (GB); Richard G Stretton, Loughborough (GB)

(73) Assignee: Rolls-Royce plc, London (GB)

( * ) Notice: Subject to any disclaimer, the term of this patent is extended or adjusted under 35 U.S.C. 154(b) by 205 days.

(21) Appl. No.: 11/187,943

(22) Filed: Jul. 25, 2005

(65) Prior Publication Data

US 2006/0038066 A1 Feb. 23, 2006

(30) Foreign Application Priority Data

Aug. 19, 2004 (GB) ................................. 0418454.5

(51) Int. Cl.
*B64D 27/00* (2006.01)

(52) U.S. Cl. ........................ 244/54; 244/53 R; 248/554; 248/555; 248/556

(58) Field of Classification Search .................. 244/54, 244/60; 248/554–557; 60/796, 797
See application file for complete search history.

(56) References Cited

U.S. PATENT DOCUMENTS

| | | | |
|---|---|---|---|
| 4,013,246 A * | 3/1977 | Nightingale .................. | 244/54 |
| 4,458,863 A | 7/1984 | Smith | |
| 4,603,821 A * | 8/1986 | White ......................... | 244/54 |
| 5,181,676 A * | 1/1993 | Lair ........................ | 244/110 B |
| 5,443,229 A * | 8/1995 | O'Brien et al. ............... | 244/54 |
| 5,452,575 A * | 9/1995 | Freid .......................... | 60/797 |
| 5,524,847 A | 6/1996 | Brodell et al. | |
| 5,746,391 A * | 5/1998 | Rodgers et al. ................ | 244/54 |
| 5,826,823 A * | 10/1998 | Lymons et al. .......... | 244/110 B |
| 5,863,014 A * | 1/1999 | Standish .................. | 244/110 B |
| 5,873,547 A * | 2/1999 | Dunstan ....................... | 244/54 |
| 6,102,328 A * | 8/2000 | Kumata et al. ............. | 244/45 R |
| 6,123,293 A | 9/2000 | Breitbach | |
| 6,126,110 A * | 10/2000 | Seaquist et al. ................ | 244/54 |
| 6,401,448 B1 * | 6/2002 | Manteiga et al. ........... | 60/226.1 |
| 6,758,438 B2 * | 7/2004 | Brefort et al. .................. | 244/54 |
| 7,063,290 B2 * | 6/2006 | Marche ....................... | 244/54 |
| 2003/0066928 A1 * | 4/2003 | Brefort et al. .................. | 244/54 |

FOREIGN PATENT DOCUMENTS

| | | |
|---|---|---|
| GB | 0 612 272 SP | 11/1948 |
| GB | 2010969 A | 4/1979 |
| GB | 2 303 884 A | 3/1997 |

OTHER PUBLICATIONS

Fig. 23-11 Typical turbo-jet engine mountings; 'The Jet Engine', Rolls-Royce plc 1986 5th Edition, pp248.
Applicant's Trent 800 mounting system which essentially is a more detailed version of the left hand figure of Fig. 23-11.

* cited by examiner

*Primary Examiner*—Timothy D Collins
*Assistant Examiner*—Philip J Bonzell
(74) *Attorney, Agent, or Firm*—Jeffrey S. Melcher; Manelli Denison & Selter PLLC

(57) ABSTRACT

An engine mounting assembly for an engine, e.g. a gas turbine engine comprises a plurality of carrying arrangements. Each carrying arrangement comprises a rear load absorbing assembly. Each load absorbing assembly provides a rear mounting point for an engine carrier. Each carrying arrangement further comprises first and second stabilising members extending forwardly from the rear mounting point of the rear load absorbing assembly to first and second spaced forward mounting points for an engine carrier.

17 Claims, 5 Drawing Sheets

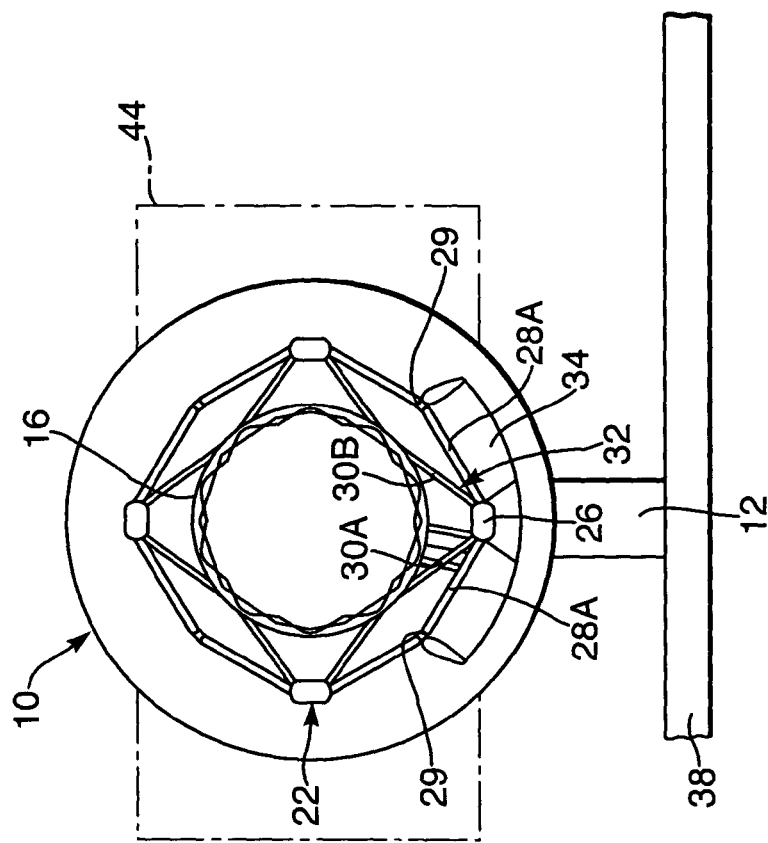
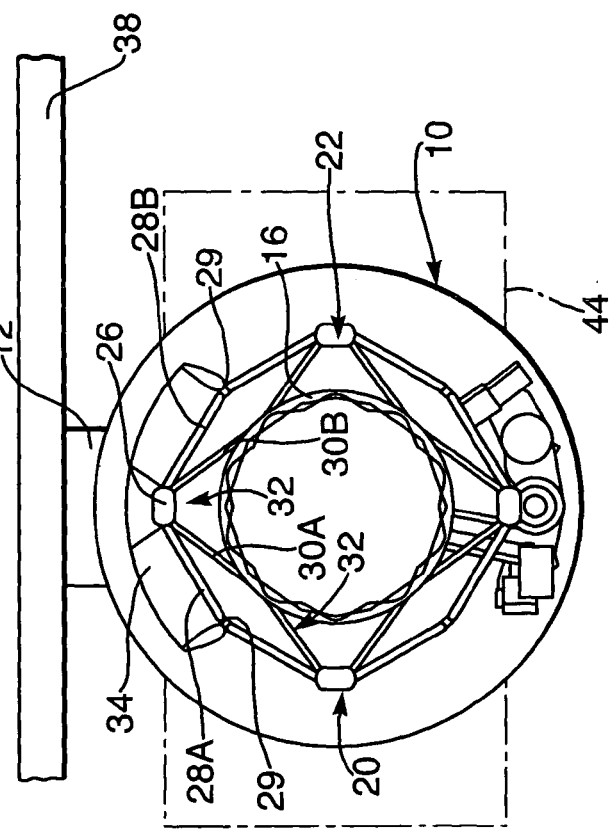

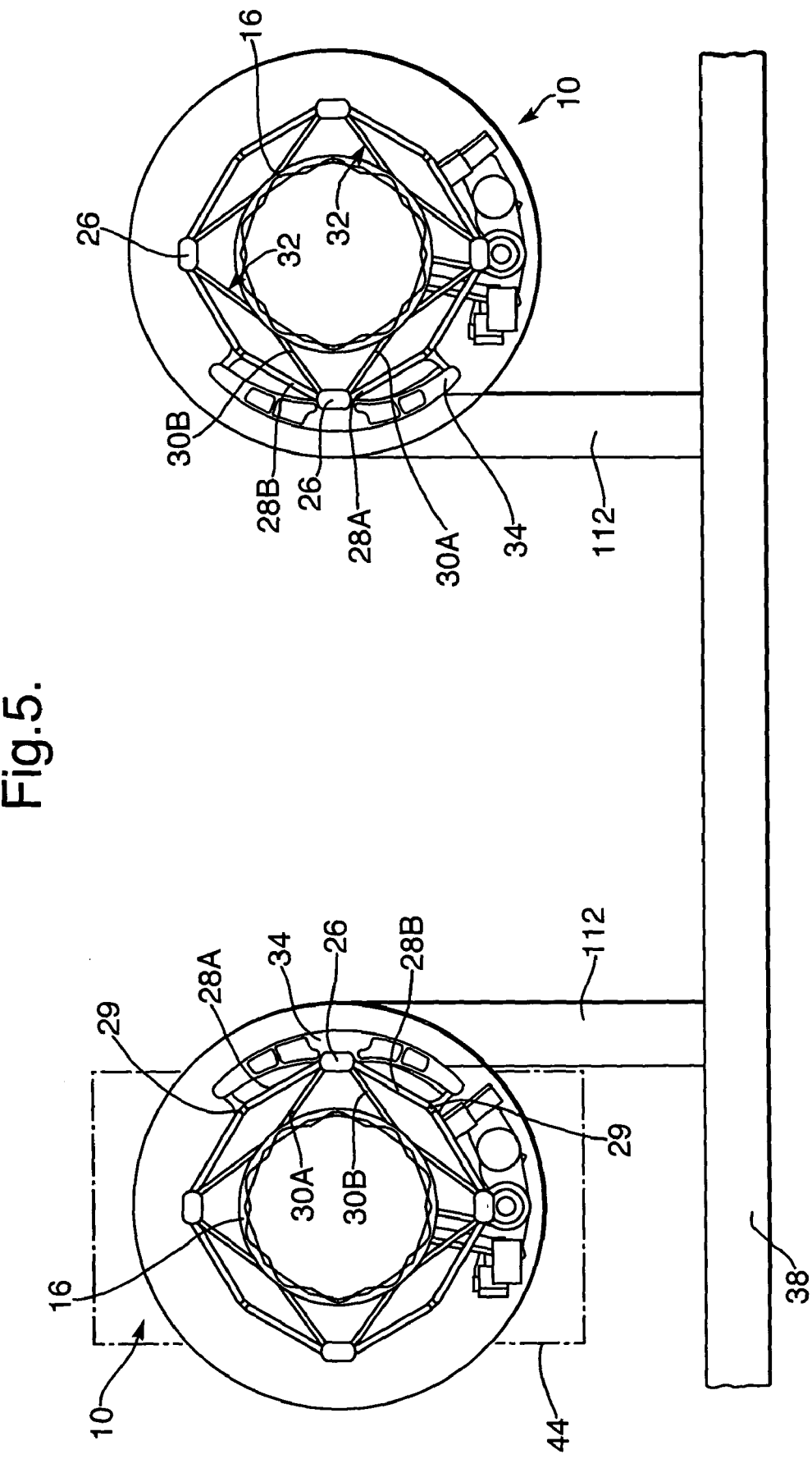

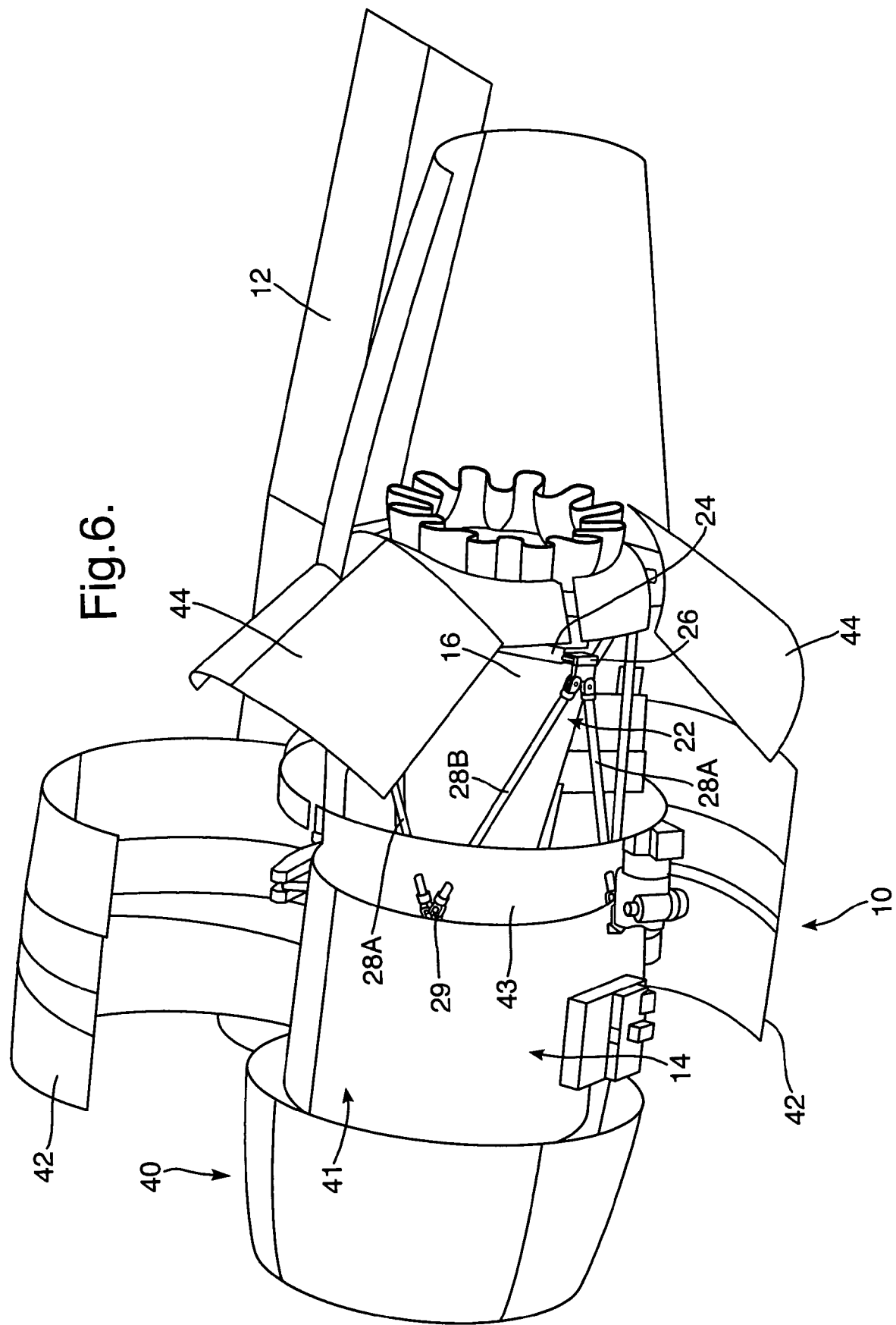

ENGINE MOUNTING ASSEMBLY

FIELD OF THE INVENTION

This invention relates to engine mounting assemblies. More particularly but not exclusively, the invention relates to engine mounting assemblies for gas turbine engines.

BACKGROUND OF THE INVENTION

There are several ways in which a gas turbine engine can be mounted onto an aircraft. One way is by the use of an integrated mount and pylon concept which requires a three node frame at the rear of the engine. In another method, an open framed structure is provided and the engine is cantilevered forward from a bulkhead on the aircraft. A third method is the use of a structural by-pass duct and rear mount ring.

SUMMARY OF THE INVENTION

According to one aspect of this invention, there is provided an engine mounting assembly for an engine, said engine mounting assembly comprising a plurality of carrying arrangements, each carrying arrangement comprising a rear load absorbing assembly mountable on the engine, each rear load absorbing assembly providing a rear mounting point for an engine carrier, and each carrying arrangement further comprising first and second stabilising members extending forwardly from the said rear mounting point of the rear load absorbing assembly to first and second spaced forward mounting points for an engine carrier.

Preferably, the spaced forward mounting points are circumferentially spaced from each other. Conveniently, each carrying arrangement comprises a frame.

The engine is preferably a gas turbine engine.

Preferably, each rear load absorbing assembly comprises a plurality of rear members. The rear members may be coupled to each other to provide a load absorbing configuration. The coupled rear members may comprise an A-frame. Preferably, the rear load absorbing assembly comprises a pair of rear members configured to form an A-frame. Each rear member preferably comprises a rear strut.

The, or each, rear mounting point may be provided at the apex of the aforesaid A-frame. The A frame may lean axially of the engine. In one embodiment, such axial leaning can be viewed from the side or the top.

Conveniently, the plurality of carrying arrangements are arranged adjacent each other, conveniently circumferentially around the engine. In one embodiment, at least one stabilising member of each carrying arrangement is coupled to a stabilising member of one of the adjacent carrying arrangements, to provide one of said forward mounting points. Preferably, each stabilising member of each carrying arrangement is coupled to a stabilising member of adjacent carrying arrangements to provide said forward mounting points. Preferably, each stabilising member comprises a stabilising strut.

Preferably each rear load absorbing assembly may be mountable on the engine core casing. Each forward mounting point may be provided at the fan case of the engine.

The engine mounting assembly may further include a front mount beam to which the carrier can be connected. The front mount beam may extend between two adjacent forward mounting points.

The engine mounting assembly may comprise up to eight rear load absorbing assemblies. Preferably, the engine mounting assembly comprises no less than three rear load absorbing assemblies. In the preferred embodiment, the engine mounting assembly comprises four rear load absorbing assemblies. The rear load absorbing assemblies are preferably substantially equispaced around the engine.

Preferably, the rear load absorbing assemblies are provided substantially at top dead centre and/or bottom dead centre and/or on the horizontal centre line left of the engine and/or on the horizontal centre line at the right of the engine.

The engine mounting assembly may comprise up to eight forward mounting points. Preferably, the engine mounting assembly comprises no less than three forward mounting points. In the preferred embodiment, the engine mounting assembly comprises four forward mounting points. Forward mounting points are preferably substantially equispaced around the engine.

BRIEF DESCRIPTION OF THE DRAWINGS

An embodiment of the invention will now be described by way of example only, with reference to the accompanying drawings, in which:

FIG. 3 is a rear view of an engine attached under the wing of an aircraft using an engine mounting assembly FIG. 4 is a rear view of an engine attached over the wing of an aircraft using an engine mounting assembly;

FIG. 5 is a rear view of two engines mounted over a wing using an alternative arrangement to that shown in FIG. 4.

FIG. 6 is a diagrammatic side view showing an engine attached to a pylon in which the fan cowl doors and the thrust reverser are open.

DETAILED DESCRIPTION OF THE INVENTION

Figure 1:
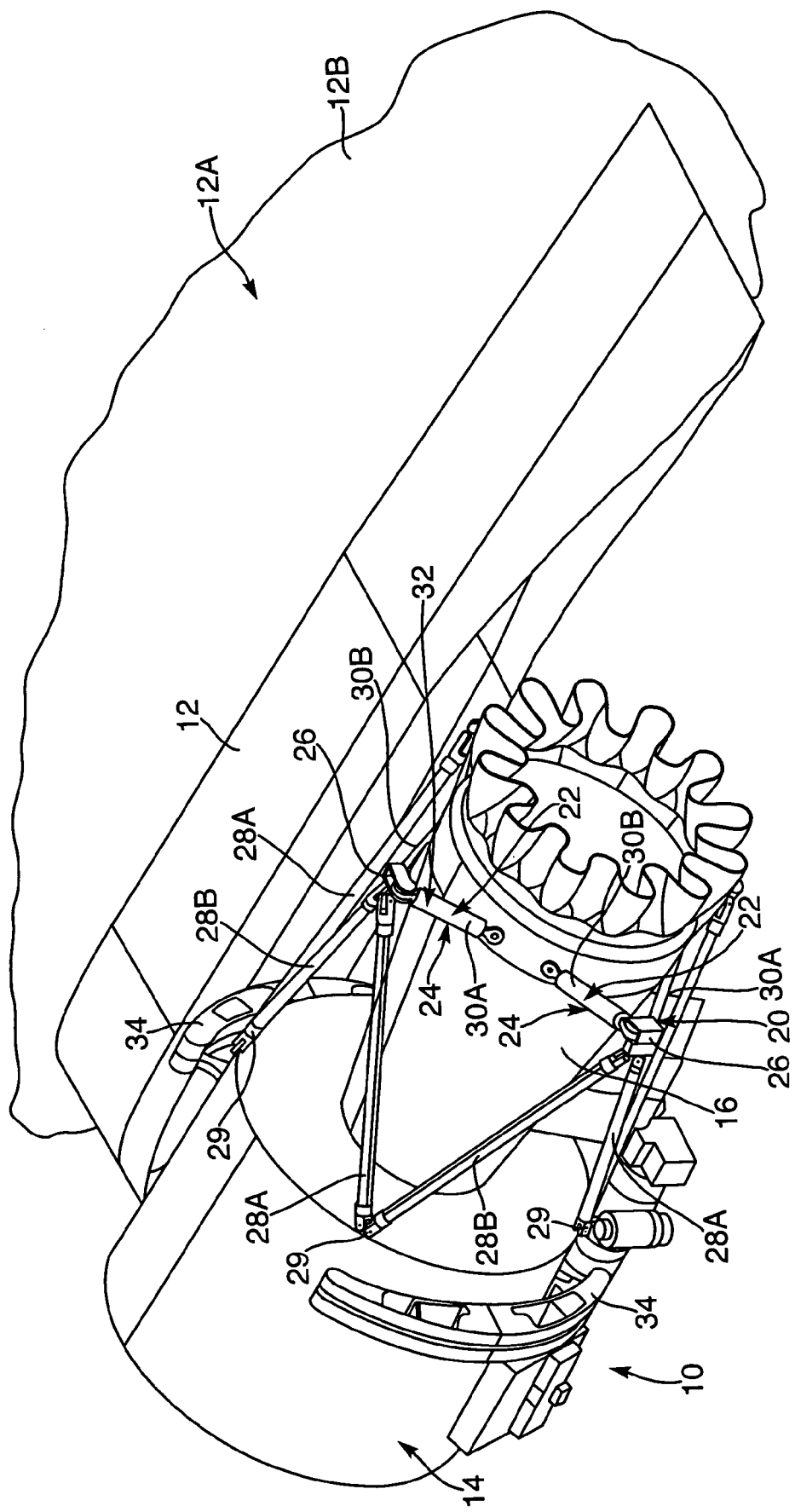
FIG. 1 is a perspective view of a gas turbine engine mounted to an aircraft by a pylon, in which the outer casing of the engine has been removed.

Referring to FIG. 1, there is shown a gas turbine engine 10 attached to a carrier in the form of a pylon 12, the pylon 12 being used to mount the engine on an aircraft 12A.

The gas turbine engine 10 is a standard gas turbine engine comprising a fan (not shown) for providing propulsive thrust. The engine also includes compressors (not shown), a combustor assembly, and turbines. Air from the fan is split into two flows. A first outer annular flow for providing the propulsive thrust, and a second inner annular flow which passes through the compressors, combustor assembly and turbines. The fan is surrounded by a fan casing 14, and the compressors, combustor assembly and turbines are surrounded by a core casing 16.

In order to mount the engine 10 to the pylon 12, and thereby to the aircraft, an engine mounting assembly 20 is provided. The engine mounting assembly 20 comprises a plurality of carrying arrangements 22. Each carrying arrangement 22 comprises a rear load absorbing assembly 24 for absorbing thrust, lateral and vertical loads on the engine. Each load absorbing assembly 24, provides a rear mounting point 26. As can be seen, the rear load absorbing assemblies 24 are circumferentially arranged around the engine towards the rear thereof and are mounted to the core casing 16.

Each carrying arrangement 22 is in the form of a frame and comprises first and second forwardly extending stabilising struts 28A, 28B which extend forwardly from the rear mounting points 26 to the fan casing 14. As can be seen, the stabilising strut 28A on one of the carrying arrangements 22 is connected to the stabilising strut 28B of the adjacent carrying arrangement 22 at the fan casing to provide a plurality of forward mounting points 29.

The preferred embodiment provides the advantages that the thrust loads are spread from the rear mounting points 26, via the first and second forwardly extending stabilising struts to the forward mounting points 29. This minimises local loading and distortion of the fan case. In addition, the forward mounting points 29 combine to absorb roll, lateral and vertical loads on the engine. In combination with the rear mounting points 26, the engine is thus mounted in a statically determinate manner.

Each of the rear load absorbing assemblies 24 comprises first and second rear struts 30A, 30B extending outwardly from each other to the core casing 16 to provide an A-frame arrangement 32.

In the preferred embodiment, the first and second rear struts 30A, 30B span the engine fan stream flow and are aerodynamically shaped to minimise losses.

In order to secure the engine 10 to the pylon 12, a front beam mount 34 is provided which connects to the fan casing 14, which, in turn, is connected to the forward mounting points 29

The pylon 12 extends rearwardly of the engine 10 to be connected to one of the rear mounting points 26 in line therewith.

Figure 2:
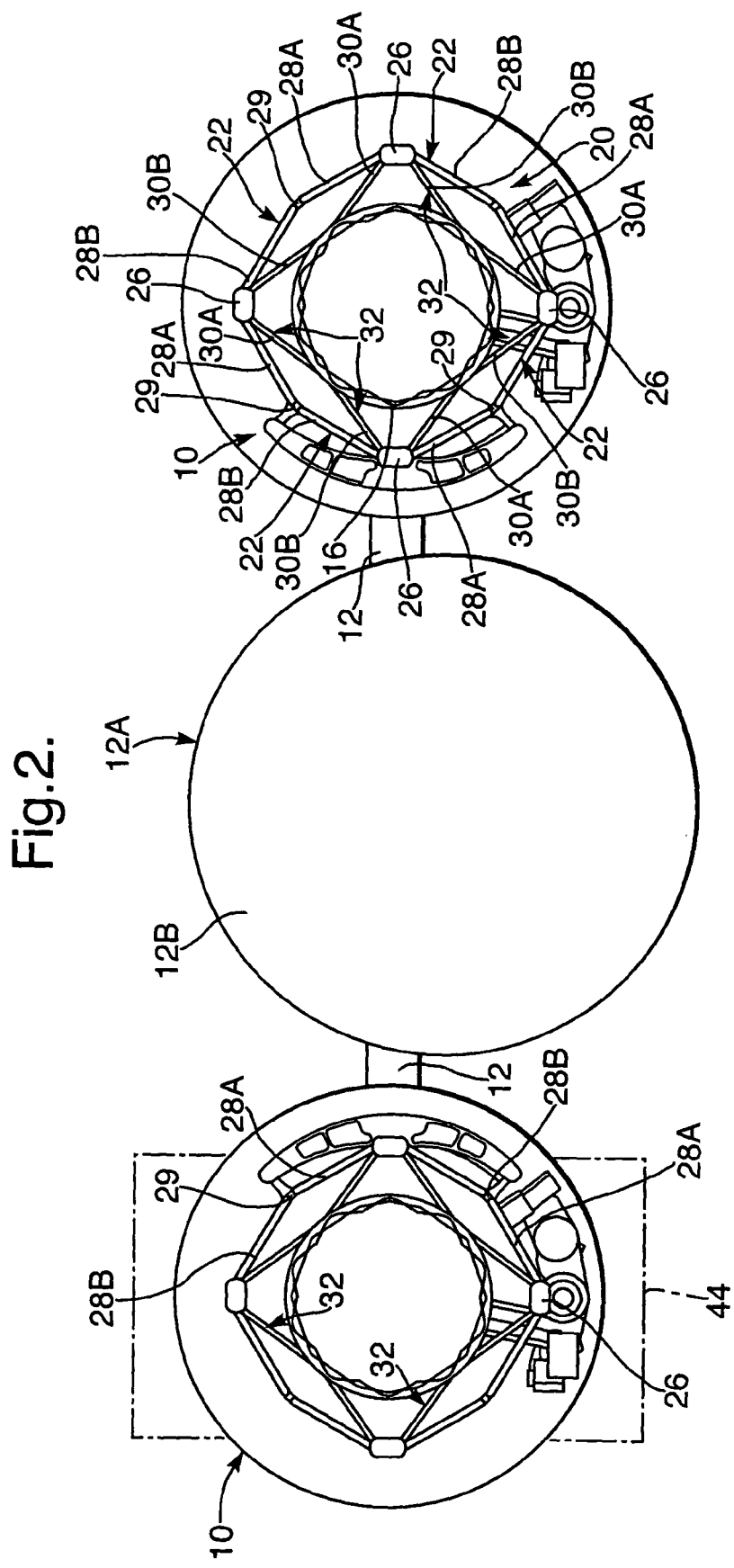
FIG. 2 is a schematic rear view showing engines attached to the fuselage of an aircraft with an engine mounting assembly.

Referring to FIG. 2, there is shown a pair of the engines 10 mounted opposite each other about the fuselage 12B of the aircraft 12A by respective pylons 12.

There is thus described a preferred embodiment of an engine mounting assembly, which is less expensive and of lighter weight then prior art engine mounting assemblies.

Referring to FIG. 3 there is shown an engine 10 which is mounted under the wing of an aircraft. The engine 10 in FIG. 3 comprises all the same features as shown in FIGS. 1 and 2, and these have been designated with the same reference numeral.

In effect, the engine 10 shown in FIG. 3 is mounted to the underside of the wing 38 in the same way that the engines 10 are mounted to the fuselage 12B of the aircraft 12A in FIGS. 1 and 2. In FIG. 3 the engine 10 is shown connected to the mounting points at the top dead center of the engine 10.

Similarly, in FIG. 4, there is shown an engine 10 mounted over the wing 38 in the same way as the engine 10 is mounted under the wing 38 in FIG. 3, and to the fuselage in FIGS. 1 and 2. In FIG. 4, the engine 10 is shown connected to the mounting points at bottom dead centre of the engine 10.

Referring to FIG. 5, there is shown another way in which the engine 10 can be mounted over a wing, this time at the front mounting point 26 at the respective right and left hand sides of the engine 10.

The embodiment shown in FIG. 5, a pylon 112 extends from the front beam mount and the rear mounting point 26 downwardly to the wing 38. This embodiment has the advantage that it avoids a clash in the amount of space available for the front mountbeam 34 and the gearbox.

FIG. 6 shows a drawing similar to FIG. 1, but in which the engine 10 is provided with an aerodynamic nacelle fairing or pod 40, surrounding an engine core 41. In FIG. 6, the nacelle 40 comprises a fixed part 43 and a pair of diametrically opposed thrust reverser doors 44. The nacelle 40 is shown with cowl doors 42 open to provide access to the internals of the engine. Also, the thrust reverser doors 44 are shown in an open condition, i.e. the position in which they are in during thrust reversal to slow down the aircraft on landing. The thrust reverser doors 44 are also shown in the open condition in broken lines in FIGS. 2, 3, 4 and 5. The thrust reverser doors 44 are movable from a closed position to an open position. In the closed position, the thrust reverser doors lie substantially flush with the fixed part 43 of the nacelle 40, and allow the thrust gases from the engine 10 to be directed rearwardly of the engine 10, thereby driving the aeroplane in a forward direction.

In the open position, as shown in FIG. 6, at least part of each of the thrust reverser doors 44 lie in the path of the thrust gases, thereby directing the thrust gases forwardly of the engine 10 to slow down the airplane, for example after landing.

As can be seen from FIG. 6 the thrust reverser doors 44 are arranged over the engine core 41. This provides the advantages in the preferred embodiment of allowing access to the engine core 41, for example for maintenance purposes.

Various modifications can be made without departing from the scope of the invention. For example, the number of carrying arrangements, 22 can be up to eight or as few as three. Also, the loud carrying members could be integrated with, or separate to, the nacelle components.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A gas turbine engine mounting assembly connecting a gas turbine engine to a pylon, the engine comprising:
    a fan casing; and a
    a core casing, the mounting assembly comprising:
    a front beam mount connecting the fan casing to the pylon, the front beam mount carrying vertical load, side load and torque during operation of the engine; and
    a plurality of carrying arrangements carrying thrust, lateral and vertical loads during operation of the engine, each carrying arrangement comprising a rear load absorbing assembly connected to the core casing, the rear load absorbing assembly absorbs thrust, lateral and vertical loads during operation of the engine and defines a rear mounting point, and each carrying arrangement further comprising first and second forwardly extending stabilizing struts which extend between the rear mounting point and two forward mounting points on the fan casing, said plurality of carrying arrangements being arranged adjacent each other and circumferentially surrounding said engine, each stabilizing strut of each carrying arrangement is coupled to a stabilizing strut of an adjacent carrying arrangement at each forward mounting point, wherein the rear mounting points are configured to attach to the pylon and the pylon connects to only one of the rear mounting points so that thrust is transferred from the core to the pylon through the rear mounting point via the stabilizing struts during operation of the engine.

2. An engine mounting assembly according to claim 1 wherein the spaced forward mounting points are circumferentially spaced from one another.

3. An engine mounting assembly according to claim 1 wherein the front mount beam extends between two adjacent forward mounting points.

4. An engine mounting assembly according to claim 1 wherein the rear load absorbing assemblies are substantially equispaced around the engine.

5. An engine mounting assembly according to claim 1 wherein the rear load absorbing assemblies are provided substantially at any of top dead centre of said engine, bottom dead centre of said engine, on the horizontal center line left of the engine, on the horizontal center line at the right of the engine.

6. An engine mounting assembly according to claim 1 wherein the forward mounting points are substantially equi-spaced around the engine.

7. An aircraft according to claim 1 wherein the engine assembly is mounted to the aircraft under side.

8. An aircraft according to claim 1 wherein the engine assembly is mounted laterally to the body of the aircraft.

9. An engine mounting assembly according to claim 1 wherein the rear load absorbing assembly comprises a pair of rear members configured to form an A-frame.

10. An engine mounting assembly according to claim 9 wherein the, or each, rear mounting point is provided at the apex of the, or each respective, A-frame.

11. An engine mounting assembly according to claim 10 wherein the, or each, A-frame leans axially of the engine.

12. An engine mounting assembly according to claim 1 wherein the engine mounting assembly comprises up to eight rear load absorbing assemblies and no less than three rear load absorbing assemblies.

13. An engine mounting assembly according to claim 12 wherein the engine mounting assembly comprises four rear load absorbing assemblies.

14. An engine mounting assembly according to claim 1 wherein the engine mounting assembly comprises up to eight forward mounting points, and no less than three forward mounting points.

15. An engine mounting assembly according to claim 14 wherein the engine mounting assembly comprises four forward mounting points.

16. An aircraft according to claim 1 wherein the engine assembly is mounted to the aircraft over an aircraft structure.

17. An aircraft according to claim 16 wherein that aircraft structure is a wing.

* * * * *